G. T. STRITE.
AUTOMATIC POWER OPERATED PLOW LIFT.
APPLICATION FILED DEC. 8, 1911. RENEWED JULY 23, 1917.
1,303,516.
Patented May 13, 1919.
3 SHEETS—SHEET 1.
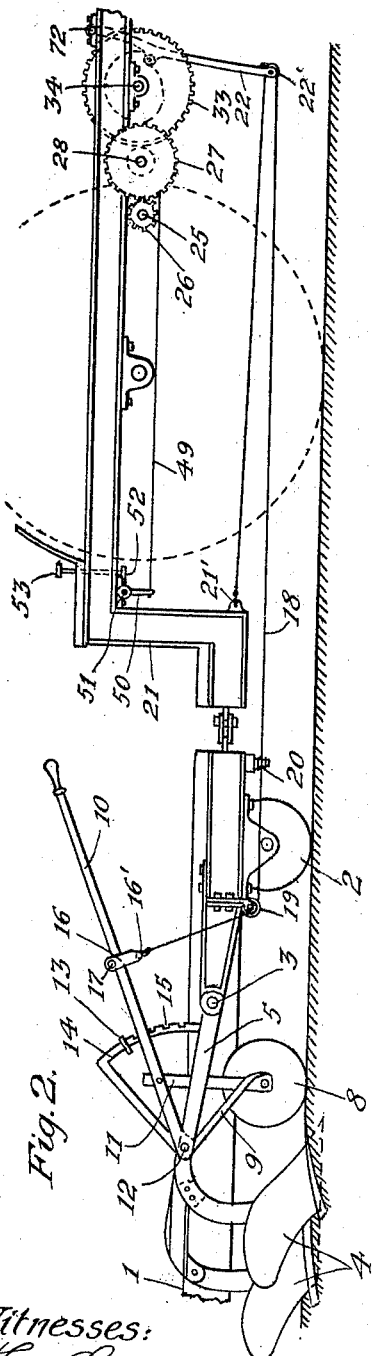
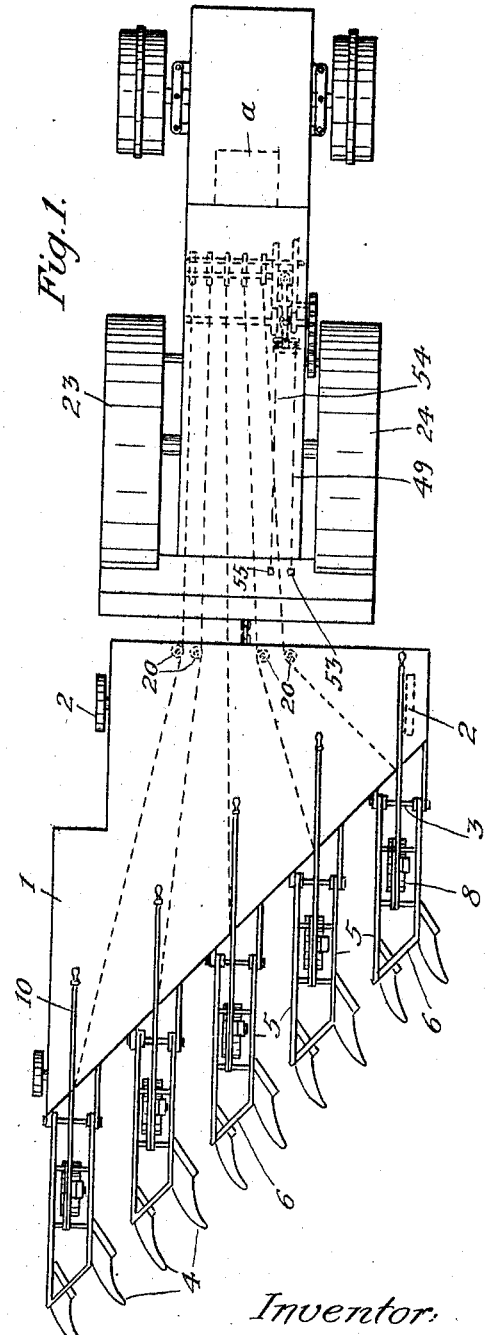
Witnesses:
Inventor:
George T. Strite.
By his Attorney

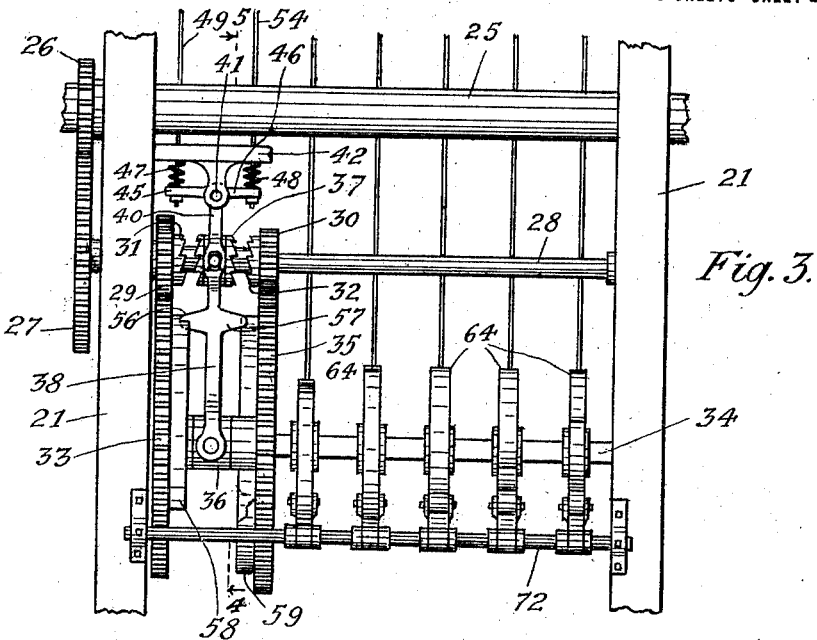
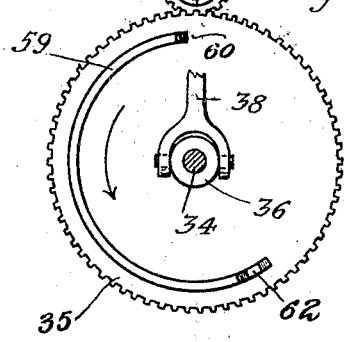
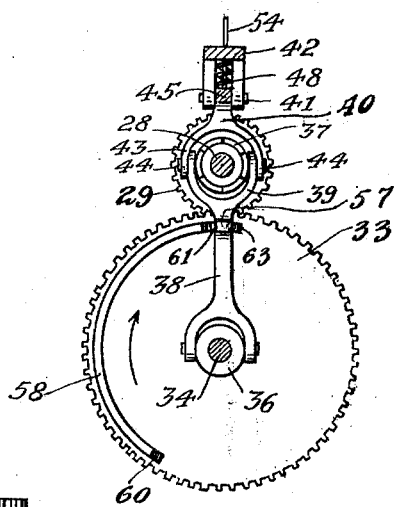
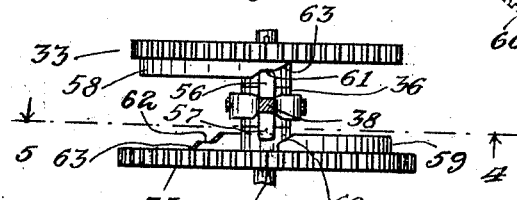

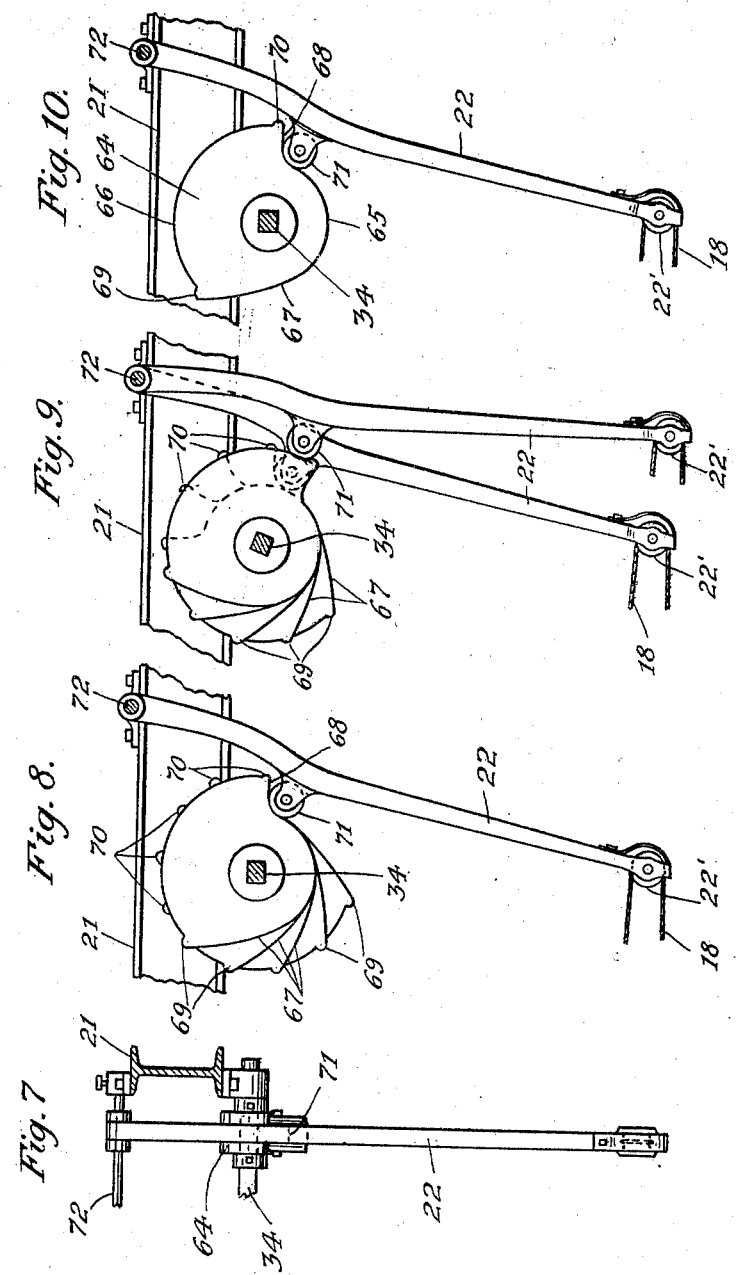

UNITED STATES PATENT OFFICE.

GEORGE T. STRITE, OF MINNEAPOLIS, MINNESOTA, ASSIGNOR TO AVERY COMPANY, OF PEORIA, ILLINOIS, A CORPORATION OF ILLINOIS.

AUTOMATIC POWER-OPERATED PLOW-LIFT.

1,303,516.                        Specification of Letters Patent.         Patented May 13, 1919.

Application filed December 8, 1911, Serial No. 664,629.  Renewed July 23, 1917.  Serial No. 182,359.

*To all whom it may concern:*

Be it known that I, GEORGE T. STRITE, a citizen of the United States, residing at Minneapolis, in the county of Hennepin and State of Minnesota, have invented certain new and useful Improvements in Automatic Power-Operated Plow-Lifts, of which the following is a specification.

My invention relates to plowing mechanisms having automatic power-operated plow lifting devices and especially relates to motor-drawn gang plows employing a large number of individual plows. It is a principal object of my invention to provide an improved mechanism, which, utilizing the power of a traction motor, will operate to lift the plows of the gang singly and successively in such order that all of the plows will come out of the ground in a line substantially at right angles to the line of travel of the machine, while further operation of such mechanism will successively drop the plows in the same timed order so that they will enter the ground in straight line transverse to the line of travel of the machine, the necessity for such a device being due to the fact that the plows of a gang must be successively advanced with respect to the plow next in the rear thereof to permit clearance for turning the furrow.

It is an especial object of my invention to employ a single cam shaft having cams thereof adapted to engage lifting members and operate such members to lift the plows during a portion of the revolution of the cam shaft and lower the plows during the remainder of such revolution, the part of the revolution employed in lifting being greater than the part employed in lowering, and to provide means to drive the cam shaft at different speeds during such lifting and lowering actions so that the successive points of lifting and of lowering will bear approximately the same relation to the forward movement of the machine.

Further objects and advantages of my invention will appear in connection with the detailed description thereof, and are particularly pointed out in the claims.

The mechanism which I have shown in the accompanying drawings is in many respects similar to that shown in my co-pending application for gang plow mechanism, Serial No. 609,628, filed February 20, 1911. I do not, therefore, in this application claim those features which are disclosed in the said co-pending application.

In the drawings which represent the application of my invention in one form,

Figure 1 is a plan of a gang plow and traction engine diagrammatically represented and showing my improvements connected therewith. Fig. 2 is a side elevation of a portion of such machines showing the manner of connection of the lifting levers to the plow levers. Fig. 3 is a plan view of a portion of a traction engine showing my plow lift attached thereto. Figs. 4 and 5 are views taken on opposite sides of section on line 4—5 of Figs. 3 and 6. Fig. 6 is a side view partly in section of the differential gearing and clutch controlling mechanism therefor. Fig. 7 is an end elevation view of one of the lifting levers showing means of connecting the lifting cords for operation thereby. Figs. 8, 9 and 10 are side views of the lifting levers and cam shafts showing the shape and relative position of the different lifting cams.

In the drawings, 1 represents the framework and platform of the gang plow, traveling upon wheels 2, to which framework are pivotally attached by means of pivot pins 3 plows 4, the beams 5 of which may be secured together in pairs by yoke members 6, as shown. Each plow or pair of plows so yoked together, has mounted thereon a roller 8 for holding the plows in position to enter the ground to the desired depth or so that said plows may be drawn from and held out of contact with the ground. The rollers 8 are held in yokes 9 secured to levers 10 and angular arms 11 fast on said levers 10, the levers being pivoted to the plow beams, as indicated at 12, and operating to raise or lower the rollers 8 with respect to the bottom of the plow share, which, by reason of the contact of the rollers 8 with the ground, will have the effect of lowering and raising the plow itself. Movement of levers 10 is limited in one direction by means of a link 13 slidably mounted on a segment 14 and adapted to enter notches 15 therein whereby the plow levers will be held from rising above said link 13. Links 13 may be moved on segment 14 in any desired manner, but in practice it will be found that satisfactory results will be obtained by simply slipping the link down the segment by hand. The levers 10 are hand levers such as ordinarily are employed in connection with gang plows of the usual type manufactured and extensively marketed. Upon levers 10 intermediate the ends thereof I mount a clevis-like link 16 having a hook 16' at one side thereof and open at the opposite side and held to lever 10 by means of a wooden pin 17. To the hooks 16 are secured flexible members 18 extending around pulleys 19 and 20 on the plow frame, where the same are desirable properly to guide the connections beneath the frame 21 of the traction engine, to and around pulleys 22' journaled in the lower ends of lifting levers 22 mounted to oscillate in said frame, as will hereinafter be described, the flexible connections being secured at the ends thereof to the frame 21, as indicated at 21'. The wooden pins 17 provide a safety device, and while amply strong to permit the power operative lifting means to lift the plows under all normal working conditions yet will shear and permit release of the parts in case from any cause the plows or connecting parts are held from response to the lifting action.

The said frame 21 is carried by traction wheels 23 and 24 which are rotated by a power shaft 25 in a well known manner, the power shaft being driven by a prime mover $a$ of common construction. The power shaft 25 is journaled transversely in the frame members 21 and is provided near one end with a pinion 26 which meshes with a gear 27 fast on a shaft 28 journaled in frame members 21. Shaft 28 has loose thereon pinions 29 and 30, pinion 29 being provided with a clutch face 31 and pinion 30 with a clutch face 32. Pinion 29 meshes with a spur gear 33 fast on a cam shaft 34 journaled in frame members 21, and pinion 30 meshes with a spur gear 35 also fast on cam shaft 34. Loosely mounted on shaft 34 between gears 33 and 35 is a sleeve 36. Splined to shaft 28 between pinions 29 and 30 is a double face clutch member 37 the faces of which are adapted to coöperate with either one or the other of clutch faces 31 and 32 or to occupy an intermediate position, as shown in Fig. 3. Pivoted to collar 36, as shown most clearly in Fig. 4, is a lever 38 having a forked end 39 embracing clutch member 37 and working in a groove therein in the usual way. A lever 40 pivoted at 41 to a bracket 42 extended from frame member 21 has the fork 43 thereof pivoted at 44 to the members of fork 39. Clutch lever 40 is provided with a pair of arms 45 and 46, respectively, pressed by springs 47 and 48 extending between said levers and bracket member 42 so as to hold clutch lever and clutch member 37 in their intermediate or inoperative position, controlling levers 38 being correspondingly positioned. A cord 49 extends from the end of arm 45 to the depending arm 50 of an angle lever pivoted at 51 to the frame 21, the other arm 52 of said angle lever being engaged by the lower end of a member 53 in position to be operated by the foot so that cord 49 may actuate lever arm 45 against the force of spring 47 to throw clutch member 37 into engagement with clutch face 31. The cord 54 extends from lever arm 48 to an angle lever similar to that above described operated by a foot member 55 to actuate lever arm 46 against the force of spring 48 to throw clutch member 37 in the opposite direction and into driving engagement with clutch face 32 on pinion 30.

On opposite sides of lever 38 are formed wing members 56 and 57, respectively, for engagement with a semicircular flange 58 extended inwardly from gear 33 or a corresponding flange 59 extending inwardly from gear 35. These flanges are of different lengths and one flange ends opposite the point where the other begins, the end portion of each flange being beveled away, as shown at 60, while at the commencement of flange 58 is a low part 61 of approximately one-half the width of the flange, and at the commencement of flange 59 is a similar low portion 62. When clutch member 37 and levers 40 and 39 are in the intermediate or inoperative position wing 56 will be in engagement with low portion 61 on cam 58 and wing 57 will be out of engagement with cam 59, as shown in Fig. 6, or the reverse condition will be true, and wing 57 will be in engagement with low portion 62 and wing 56 out of engagement with cam 58. It will be possible, therefore, to actuate clutch lever 40 at any time in but one direction only which will be the direction to clutch the mechanism for lifting the plows if they are down or to clutch the mechanism for lowering the plows if they are up. After clutch lever 40 has been actuated by either foot member 53 or 55 to clutch for driving action either pinion 29 or pinion 30,—as, for example, if the parts, being in the position shown in Fig. 6, are shifted to clutch pinion 29 for driving action, then wing 56 will be withdrawn from low portion 61 and flange 58 engaging such wing will positively hold the parts clutched during such rotation of the cam shaft through pinion 29 and gear 33 as is equal to the total length of flange 58. When the end of such flange is reached wing 56 will slide down the beveled portion thereon and wing 57 will be pushed up a similar beveled portion 63 at the beginning of flange 59 until it reaches the neutral or intermediate position in which the clutch is disconnected and driving action is discontinued. Under ordinary conditions the spring 47 or the spring 46 will bring said parts to their normal position without requiring operation of the wedge-like beveled portion 33 at the beginning of flange 59 or flange 58, but in case the operator shall have neglected to remove his foot from foot member 53 or foot member 55, whichever the case may be, so that the springs are held inoperative to effect return of the parts, said cam faces 63 will nevertheless operate positively to return the parts to inoperative position and effect the necessary unclutching.

The cam shaft 34 may be square in cross section, as shown in Figs. 9 to 11, and upon this shaft are a series of cams 64 of the shape more particularly shown in Fig. 10, each cam having a low circular portion 65, a high concentric circular portion 66, a gradual lifting cam portion 67 extending from low portion 65 to high portion 66 and an abrupt portion 68 extending in a radial line from high portion 66 to low portion 65. There is also formed at the beginning and end of high portion 66 two slightly raised nubs or stops 69 and 70. The cam surfaces 67 are the plow lifting surfaces and the surfaces 68 are the plow dropping surfaces. It is necessary in order to obtain the most satisfactory results to employ a cam surface for lifting the plows which shall operate with a gradual wedging action and not pull the plows up too suddenly. On the other hand, when the time for dropping the plows upon the ground comes they cannot be lowered too quickly. For this reason cam surfaces 67 are made long and gradual and cam surfaces 68 straight radial drops. This requires a larger part of the rotation of the cam or cam shaft to be given up to the lifting action. As clearly indicated in Figs. 8 and 9, the different cam members 64, of which in this instance five are shown, are differentially positioned on the cam shaft, each of the five cams engaging a roller 71 journaled in bearings on levers 22, so that as the cam shaft is rotated lifting portions 67 will successively engage rollers 71, thereby successively rocking levers 22 on the shaft 72 secured in frame members 21 to which said levers are pivoted. The first lever to be oscillated will pass over raised portion 69 and be sustained by high portion 66 while the cam shaft continues its revolution and successively lifts the other plows, roller 71 of said first lever just reaching stop 70 at the rear end of high portion of its cam as roller 71 on the last lever passes over stop 69 at the front end of its cam, when unclutching action takes place and the two rollers engaging stops 70 and 69 on the first and last cams, respectively, will operate to prevent possible rotation of cam shaft 34 beyond the desired point by reason of acquired momentum or from other causes.

By referring to Fig. 8 it will be noted that the angle from the inactive positions of the rollers around to the end of the lifting part of the last cam is approximately 210 degrees, the remaining 150 degrees being occupied by the inactive sustaining parts 66 of the cams and by the drop parts 68. As before stated, the lifting parts of the cams are long and are shaped to act gradually. It is desirable that there be as little overlapping as possible of the lifting parts of the cams and, therefore, it is necessary to so arrange the cams with the active portion extending over more than 180 degrees. In this case, as shown in Fig. 8, the angle occupied by the active parts of the cams is 210° as above stated.

Since, as above indicated, a greater part of the revolution of cam shaft 34 must be employed in lifting the plows than is the case for lowering the same, it is necessary to drive the cam shaft at a different and slower speed for lowering than the speed at which it is driven for lifting, and this is accomplished by the two sets of drives through pinions 29 and 30 and gears 33 and 35, the ratio of this gearing being such that the rotation of the cam shaft through pinion 29 and gear 33 to effect the aforesaid lifting action will take place during an advance of the engine and plows which equals the advance which takes place during the rotation of cam shaft for dropping the plows effected by pinion 30 and gear 35. It is obvious that the exact relative extent of rotation for lifting and dropping action, respectively, may be varied as is found most expedient by effecting a corresponding variance in the ratio of gearing of the aforesaid double drive.

The flange members 58 and 59 will in any event each equal in extent the extent of rotation which the gear to which the flange is attached must make to effect its lifting or dropping action. These flanges in combination with the clutch controlling mechanism and more especially the lever 38 and wings 57 provide means not only for maintaining in action either the plow lifting or the plow dropping gearing the desired extent, but also a safety device which absolutely prevents clutching-in the wrong set of gearing, and which, in fact, will operate positively to terminate driving action at the proper point in the rotation of the cam shaft regardless of the action of the operator. This insures absolutely accurate work on the part of the plow lifting device and renders impossible any accident or mistake. If the operator attempts to press down the wrong foot member 53 or 55 nothing happens as the low portion 61 or 62 of flange 58 or 59 will lock the clutch operating device against movement in that direction, and the operator discovering his mistake through inability to operate the clutch will immediately actuate the correct foot member to bring about the operation of the plow lifting means desired.

My improved plow lift may readily be attached to various types and makes of traction engines without material difficulty. It can be manufactured economically and is absolutely efficient and reliable in service. It cannot get out of repair, employs the power of the traction engine or other prime mover directly and always has a superabundance of power to effect the lifting action. Each plow is lifted clear of the ground before the succeeding plow begins to move and yet the lifting cam surfaces 67 have such a gradual rise that while the plow will come up quickly it will be without injurious shock or suddenness. The plow lift can be used with any of the well known types of gang plows now manufactured and on the market with no change whatever other than the addition of the shifts or rollers 19, 20, and at the same time the hand-operative plow lifting levers may be used to perform their function of lifting the plows independently by hand where this is desired.

I claim:

1. A plow lifting device comprising a cam for lifting and lowering the plow, and means to rotate the cam at one speed for lifting action and at a slower speed for lowering action.

2. A plow lifting device comprising a cam having a low portion, a high portion, a long lifting incline extending from the low portion to the high portion, and a radial drop between the other ends of the high and low portions, and means to operate the cam at different speeds for lifting and lowering action, respectively.

3. A plow lift comprising a series of lifting members each having independent connection with the plows of a gang, a single cam shaft and cams thereon having lifting and lowering portions differentially positioned and continuously engaging said lifting members, and means to rotate the cam shaft at two speeds one for successively lifting and the other for successively lowering the plows.

4. A plow lift comprising a series of lifting members each having independent connection with the plows of a gang, a single cam shaft and cams thereon having lifting and lowering portions differentially positioned and continuously engaging said lifting members, and means to rotate the cam shaft a major portion of a revolution to effect successive lifting of all the plows, and to rotate the shaft at a slower speed for the remaining portion of a complete revolution to lower the plows successively.

5. In a traction plow having a tractor and a gang of plows, a prime mover, means connected with the plows including a rotary shaft for successively lifting or lowering the plows, means under the control of the operator for effecting operative connection between the prime mover and the shaft to drive the same at either of two speeds for lifting and lowering action, respectively, and means carried by the shaft for automatically holding said connecting means operative at either speed until the shaft has rotated sufficiently to lift or lower all of said plows.

6. In a traction plow having a tractor and a gang of plows, a prime mover, means connected with the plows including a rotary shaft for successively lifting or lowering the plows, means under the control of the operator for effecting operative connection between the prime mover and the shaft to drive the same at either of two speeds for lifting and lowering action, respectively, and means for automatically holding said connecting means operative at either speed until the shaft has rotated sufficiently to lift or lower all of said plows.

7. In a traction plow having a tractor and a gang of plows, a prime mover, means connected with the plows including a rotary shaft for successively lifting and lowering the plows, means under the control of the operator for effecting operative connection between the prime mover and the shaft to drive the same at either of two speeds for lifting and lowering action, respectively, and means to prevent making connection for lifting speed when the plows are up or for lowering speed when the plows are down.

8. Power lifting means for plows comprising lifting devices, a driven shaft, a second shaft having means thereon for actuating the lifting devices, two differently speeded sets of devices for effecting operative connection between the driven shaft and the second shaft, and two devices carried by the second shaft each coöperating with one of the said sets of connecting devices to positively prevent the breaking of the operative connection between the said shafts for a determined period and then to terminate positively said operative connection.

9. Power lifting means for plows comprising lifting devices, a driven shaft, a second shaft having means thereon for actuating the lifting devices, means including a pivoted arm for effecting operative connection between the driven shaft and the second shaft to turn the latter at either of two speeds, and means rotatable with said second shaft and coöperating with the pivoted arm to positively prevent the breaking of the operative connection between the said shafts for a determined period and then to positively terminate said operative connection.

10. Power lifting means for plows comprising lifting devices, a driven shaft, a second shaft having means thereon for actuating the lifting devices, a pair of differently diametered gears fast on the second shaft, a pair of differently diametered gears loose on the driven shaft and coöperating therewith and each provided with a clutch face, a coöperating double-faced clutch splined on the driven shaft between said clutch faces, means for operating the clutch, a pivoted arm connected with the clutch, and annular means on each first named gear coöperating with said arm to maintain for a determined period and then to terminate the operative connection of said clutch with one of the other gears.

11. Power lifting means for plows comprising lifting devices, a driven shaft, a second shaft having means thereon for actuating the lifting devices, a pair of gears fast on the second shaft, correspondingly positioned gears loose on the driven shaft coöperating with the gears on the second shaft for driving the same at two speeds, a clutch splined to the driven shaft intermediate the gears thereon for connecting either for driving action, and means for holding the clutch from connection with the gear last clutched-in until after the other gear has been clutched-in and operated.

12. Power lifting means for plows comprising lifting devices, a driven shaft, a second shaft having means thereon for actuating the lifting devices, a pair of gears fast on the second shaft, correspondingly positioned gears loose on the driven shaft coöperating with the gears on the second shaft for driving the same at two speeds, a clutch splined to the driven shaft intermediate the gears thereon for connecting either for driving action, and means to maintain for a determined period less than a complete revolution and then to terminate the driving action of each gear successively after the same has been clutched-in, said means being such that the successive operation of both sets of gears will rotate the second shaft through one complete revolution.

13. Power lifting means for plows comprising lifting devices, a driven shaft, a second shaft having means thereon for actuating the lifting devices, a pair of gears fast on the second shaft, correspondingly positioned gears loose on the driven shaft coöperating with the gears on the second shaft for driving the same at two speeds, a clutch splined to the driven shaft intermediate the gears thereon for connecting either for driving action, and means to maintain for a determined period less than a complete revolution and then to terminate the driving action of each gear successively after the same has been clutched-in, said means including devices for holding the clutch from successive connection with the same gear.

14. In a plow lift, means for lifting the plows of a gang successively, a driven member, means including two differently speeded pairs of gears to connect said driven member to operate the lifting means, a controlling member having connection with the connecting gears, a flange on one gear of each pair for engaging said controlling member to cause the same to hold the driven member in operative connection with the lifting means through the corresponding pair of gears, and a flange on the corresponding gear of the other pair having a cam portion for engaging said controlling member to cause the same to positively disconnect the driven member when the controlling member is released from action of the first named flange.

15. In a plow lift, means for lifting the plows of a gang successively, a driven member, means including a pair of gears to connect said driven member to operate the lifting means, an inwardly turned flange on one gear extending circumferentially thereof more than 180°, a similar flange on the other gear less than 180° in extent and positioned opposite the flangeless portion of the first named gear, each of said flanges being provided at the front end thereof with a wedge-shaped cam portion running into a low portion on the flange, a lever having connection with the connecting means and being provided with means thereon for engagement with said flanges, said lever normally occupying an intermediate position in engagement with one or the other of said low portions, and being held by said flanges when in operation in one or the other of two active positions.

In testimony whereof I affix my signature in presence of two witnesses.

GEORGE T. STRITE.

Witnesses:
F. A. WHITELEY,
H. A. BOWMAN.